Feb. 18, 1936. J. E. GLOEKLER 2,031,307
MEAT HOLDER
Filed July 24, 1934
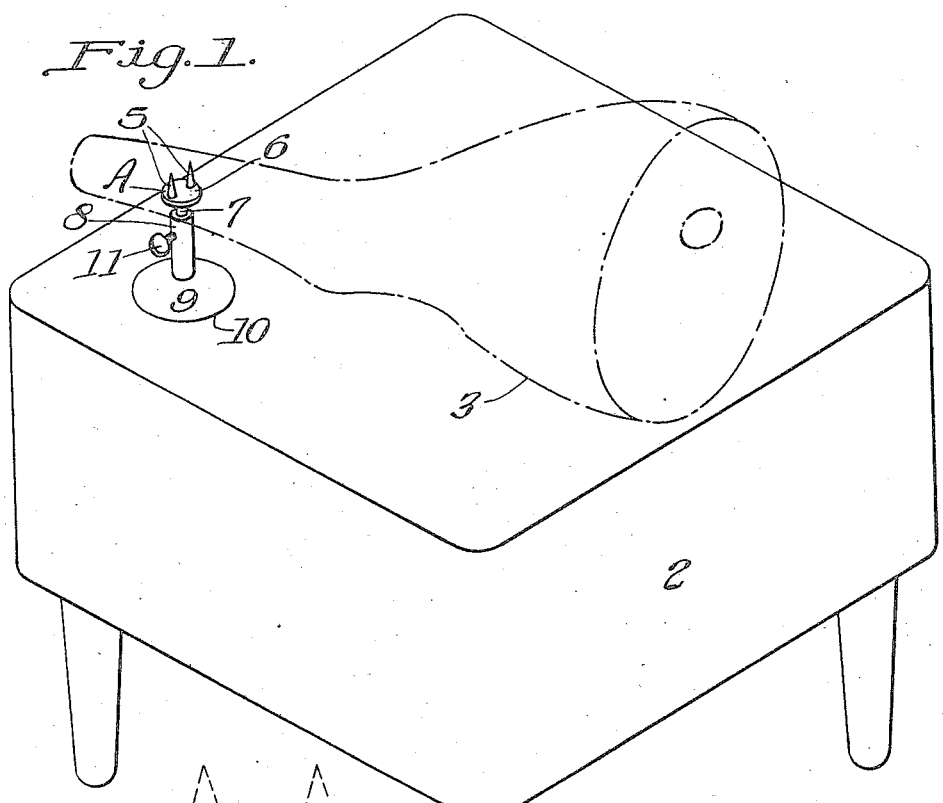
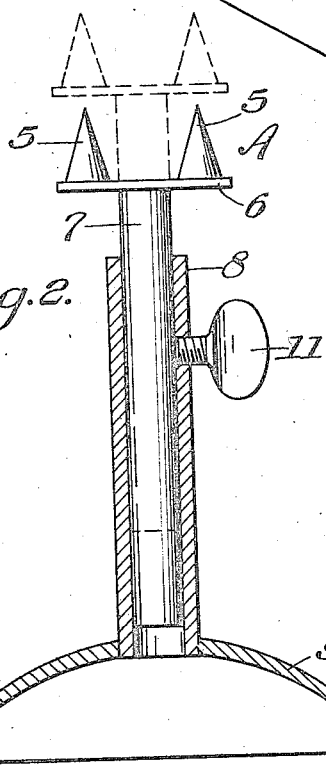
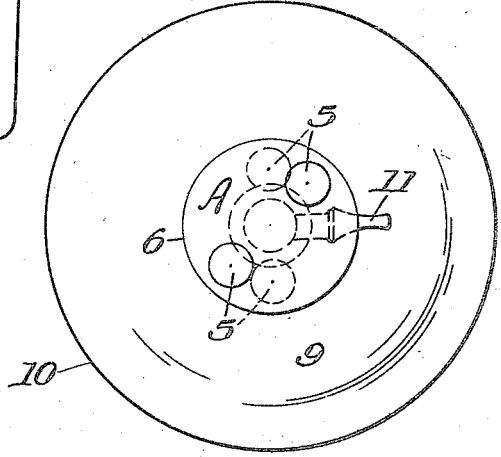
INVENTOR.
John Edward Gloekler
BY C. M. Clarke
ATTORNEY.

Patented Feb. 18, 1936

2,031,307

UNITED STATES PATENT OFFICE 2,031,307

MEAT HOLDER

John Edward Gloekler, Pittsburgh, Pa.

Application July 24, 1934, Serial No. 736,645

1 Claim. (Cl. 146—216)

This invention consists of an improvement in movement arresting meat holders adapted to engage and firmly support a joint, leg, shoulder or other meat unit upwardly above the surface of a block, for cutting and bone sawing.

It has in view to provide a simple, strong and substantial support, movably mounted on the surface of a block for lateral placement, having a vertically and angularly adjustable double prong terminal fork, as hereinafter more fully described.

Referring to the drawing:

Fig. 1 is a perspective view showing the invention as located and used on a block;

Fig. 2 is a part sectional view of the device in elevation;

Fig. 3 is a plan view of Fig. 2.

In the drawing, 2 is a conventional block commonly used by butchers for cutting meat from a main unit 3. Such units usually vary greatly in size, shape and contour, and are somewhat mobile and frequently tend to slide or move on the block surface, as a slice or portion is removed.

It is desirable, therefore, to hold the meat unit very firmly by means capable of accommodation to the variable surface exposed. To this end, I have provided a double spike fork A having the spaced apart pointed tines 5 adapted to be inserted in the under side of the unit 3 when it is laid thereon, as in Fig. 1.

Fork A consists of a flange 6 in the form of a disk or other suitable shape, to which the tines 5 are firmly secured by welding, threaded studs, or otherwise. The tines are suitably spaced apart for firm double engagement with the unit when it is pressed thereon by gravity or manual force, and the flange 6 is fixedly connected with a supporting stem 7.

Said stem or rod is telescopically mounted in a cylindrical standard 8, the stem and standard being of suitable length for properly adjusting the elevation of the fork above the surface of block 2.

Standard 8 is fixedly connected with a supporting base 9 of circular dome form as shown, or other suitable design, for ample bottom contact by its knife edge 10 with the block surface at any location thereon.

The knife edge bottom rim of the base 9 facilitates placement of the base at any desired location with holding engagement against the surface of the block, thereby avoiding lateral shifting during use.

A thumb nut or set screw 11 has threaded engagement in the side of standard 8 for binding engagement against stem 7, for holding the stem and fork at any desired elevation.

While the entire device as shown is itself freely rotatable with the stem 7 on the surface of the block, it is preferable under some conditions to rotatably adjust the stem 7 in its standard for best contact and insertion of both tines in the variable surface contour of the unit.

Depending on the size and weight of unit 3, such adjustments are readily available and greatly facilitate the handling and cutting of a joint within a wide range of size and weight.

When the unit is placed in position, its larger portion is supported on the block surface with the opposite end resting on the support. The butcher may then firmly hold the unit with one hand and cut with the other vertically, due to the proper elevation of the smaller end. Whatever may be the thickness of the larger end it may thus be readily adjusted to bring the cutting plane at right angles to the surface of the block.

As indicated in Fig. 3, rotation of stem 7 and the fork disk 6 facilitates variable desired location of the tines 5 to most effective contact and piercing engagement against the under surface of the unit. The disk or flange 6 serves to firmly support and arrest it when the tines are completely inserted, although in the case of small units, they may only pierce part way.

While in the preferred construction I use a pair of tines, equally spaced from the center of stem 7, one centrally located tine may be used to advantage for use with relatively light or small units, as desired.

The lateral placement of base 9 on the block, with holding engagement against shifting by its knife edge, also is of advantage in locating the device at any desired point on the block, where it will remain fixed under the weight of unit 3. The compound adjustment and securing of the fork stem 7 by the thumb screw 11 provides means for holding the unit 3 to the best advantage for severance of portions thereof, as described.

The construction and operation of the invention will be readily understood and appreciated by all those familiar with the practice of cutting meat from a large unit on a block or the like.

It is comparatively simple, cheap, durable, not likely to get out of order, and has the ample capacity for use with many and various shapes, sizes, and surface contours of the usual commercial meat units.

What I claim is:

In a meat holding device for supporting meat at various heights and at different locations on the surface of a wooden block, the combination of a hollow circular base having a continuously annular bearing portion terminating in a uniformly level comparatively blunt knife edge, a tubular standard secured in the middle top portion of the base and extending upwardly therefrom, a cylindrical stem vertically and rotatably mounted in the tubular standard having at its upper end a disk provided with a double tined comparatively blunt fork, and a thumb screw mounted in the tubular standard adapted to fixedly engage the stem.

JOHN EDWARD GLOEKLER.